United States Patent
Gilchrist et al.

(10) Patent No.: US 10,116,023 B2
(45) Date of Patent: Oct. 30, 2018

(54) PHASE SHIFT OF SIGNAL REFLECTIONS OF SURFACE TRAVELING WAVES

(71) Applicant: The Boeing Company, Chicago, IL (US)

(72) Inventors: Garrett L. Gilchrist, St. Louis, MO (US); Richard W. Burns, Edwardsville, IL (US); Michael P. Hurst, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 15/332,455

(22) Filed: Oct. 24, 2016

(65) Prior Publication Data

US 2017/0040686 A1 Feb. 9, 2017

(51) Int. Cl.
*H01P 1/18* (2006.01)
*H04B 3/52* (2006.01)
(Continued)

(52) U.S. Cl.
CPC .............. *H01P 1/18* (2013.01); *H01Q 15/006* (2013.01); *H04B 3/52* (2013.01); *H01Q 1/52* (2013.01); *H01Q 13/18* (2013.01); *H01Q 13/28* (2013.01)

(58) Field of Classification Search
CPC .... H04B 3/56; H04B 3/52; H01P 7/06; H01P 1/207; H01P 1/18; H01P 1/182;
(Continued)

(56) References Cited

U.S. PATENT DOCUMENTS

| | | | |
|---|---|---|---|
| 4,301,456 A | 11/1981 | Lovick, Jr. | |
| 2015/0244079 A1* | 8/2015 | White | H01Q 15/0013 343/913 |
| 2017/0302006 A1 | 10/2017 | Lavin et al. | |

FOREIGN PATENT DOCUMENTS

| | | |
|---|---|---|
| WO | 2015126521 | 8/2015 |
| WO | 2016087749 | 6/2016 |

OTHER PUBLICATIONS

EPO Extended European Search Report, dated Feb. 20, 2018 for European Application No. 17186981.1.
(Continued)

*Primary Examiner* — Rakesh Patel
*Assistant Examiner* — Jorge Salazar, Jr.
(74) *Attorney, Agent, or Firm* — Kevin Pumm

(57) ABSTRACT

An apparatus is provided for causing a phase-shift in reflected signals that are a reflection of surface-traveling wave signals of a select signal frequency. The apparatus comprises a conductive strip having a plurality of slots therein alternatingly arranged orthogonal to each other, each slot having an effective length that is a fraction between 9/16 and 7/8 of the wavelength associated with the select signal frequency, and a plurality of conductive enclosures respectively disposed under each of the plurality of slots. Each of the conductive enclosure have a width and length sufficient to enclose a respective corresponding slot, and a depth that is a fraction of between 1/8 and 3/8 of the wavelength associated with the select signal frequency when transmitted in the dielectric material. The plurality of slots and plurality of conductive enclosures cause a phase-shift in the range of 150 to 210 degrees in reflected signals that are a reflection of surface-traveling wave signals at the select signal frequency which impinge the apparatus.

20 Claims, 3 Drawing Sheets

(51) Int. Cl.
  *H01Q 15/00*  (2006.01)
  *H01Q 1/52*  (2006.01)
  *H01Q 13/18*  (2006.01)
  *H01Q 13/28*  (2006.01)
(58) Field of Classification Search
  CPC ........ H01Q 15/006; H01Q 1/52; H01Q 13/18;
  H01Q 13/28
  USPC .............. 333/24 R, 202, 203, 227, 230, 248;
  340/12.33, 12.38, 310.01
  See application file for complete search history.

(56) References Cited

OTHER PUBLICATIONS

Sievenpiper, Daniel F., "High Impedance Electromagnetic Surfaces," Internet: URL: http://optoelectronics.eecs.berkeley.edu/ThesisDan.pdf, Jan. 1, 1999, Los Angeles.

* cited by examiner

PHASE SHIFT OF SIGNAL REFLECTIONS OF SURFACE TRAVELING WAVES

FIELD

The present disclosure relates to surface traveling waves, and more particularly to reflections of surface traveling waves.

BACKGROUND

This section provides background information related to the present disclosure which is not necessarily prior art.

A signal waveform can take the form of a surface traveling wave that travels along a continuous surface, which may have use in various applications. Depending on the frequency of the signal, a surface traveling wave traveling along a surface may be reflected when the wave encounters various types of surface irregularities. While attempts have been made using various materials to address the issue of these reflections, such attempts are limited in their capability. Therefore, it would be advantageous to have an apparatus and method that takes into account at least some of the issues discussed above as well as possibly other issues.

SUMMARY

This section provides a general summary of the disclosure, and is not a comprehensive disclosure of its full scope or all of its features.

According to various aspects of the present disclosure, exemplary embodiments of an apparatus are provided for causing a phase-shift in reflected signals that are a reflection of surface-traveling wave signals of a select signal frequency. In one exemplary embodiment, an apparatus for causing a phase-shift in reflected signals of surface-traveling wave signals at a select signal frequency comprises a conductive strip having a plurality of slots therein. The slots are alternatingly arranged orthogonal to each other, each slot having an effective length that is a fraction of the wavelength associated with the select signal frequency. The apparatus further includes a plurality of conductive enclosures respectively disposed under each of the plurality of slots, each conductive enclosure having a width and length sufficient to enclose a respective corresponding slot. The conductive enclosures have a dielectric material therein and have a depth that is a fraction of between 1/8 and 3/8 of the wavelength associated with the select signal frequency when transmitted in the dielectric material. The plurality of slots and plurality of conductive enclosures with a dielectric material cause a phase-shift in the range of 150 to 210 degrees in reflected signals that are a reflection of surface-traveling wave signals at the select signal frequency that impinge the apparatus.

According to another aspect of the present disclosure, an embodiment of a method is provided for producing an apparatus for causing a phase-shift in reflected signals that are a reflection of surface-traveling wave signals of a select signal frequency. An exemplary method comprises the steps of forming a plurality of slots in an elongate conductive strip, alternatingly arranged orthogonal to each other, each slot having an effective length that is a fraction of between 9/16 and 7/8 of the wavelength associated with the select signal frequency. The method further comprises affixing a plurality of conductive enclosures to the conductive strip, with each of the conductive enclosures respectively disposed under each of the plurality of slots, and having a width and length sufficient to enclose a corresponding respective slot. Each of the conductive enclosures include a dielectric material therein and have a depth that is a fraction of between 1/8 and 3/8 of the wavelength associated with the select signal frequency when transmitted in the dielectric material. The method of forming the plurality of slots, and affixing the plurality of conductive enclosures, is effective to cause a phase-shift in the range of 150 to 210 degrees in reflected signals that are a reflection of surface-traveling wave signals at the select signal frequency that impinge the apparatus.

Further areas of applicability will become apparent from the description herein. The description and specific examples in the summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
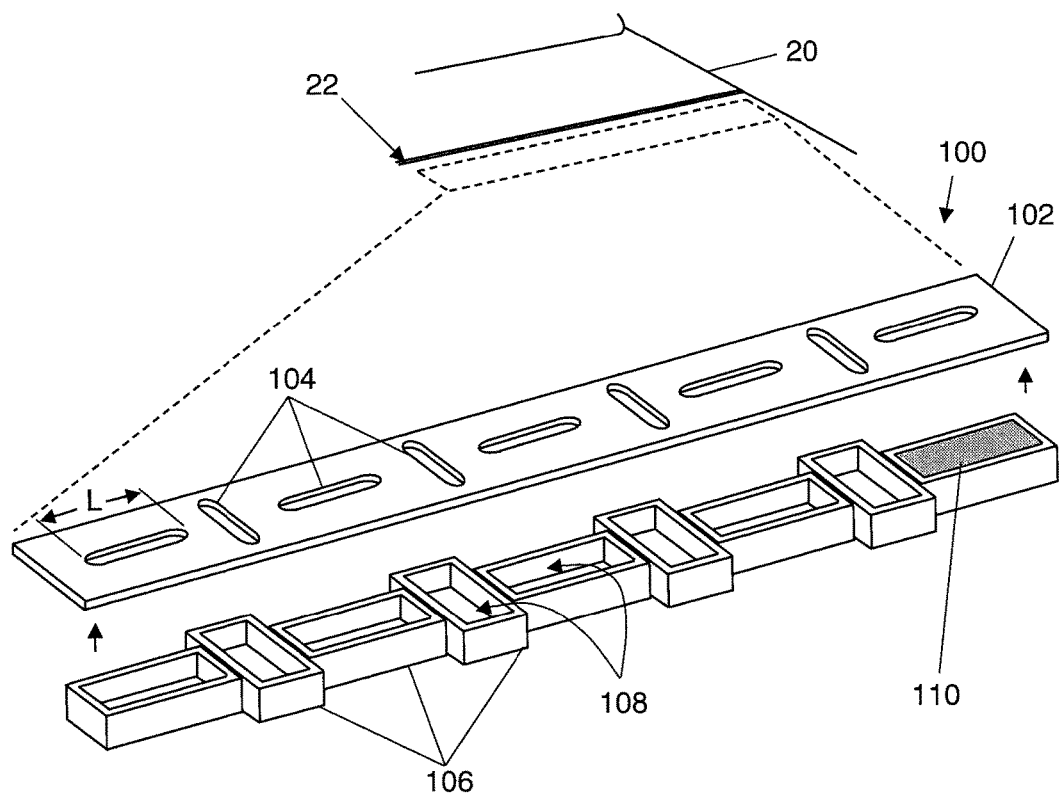
FIG. 1 is an illustration of an exemplary embodiment of an apparatus for causing a phase-shift in reflected signals of surface-traveling wave signals that are at a select signal frequency, according to one aspect of the present disclosure.
Figure 3:
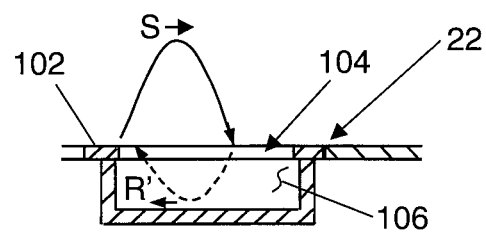
Figure 4:
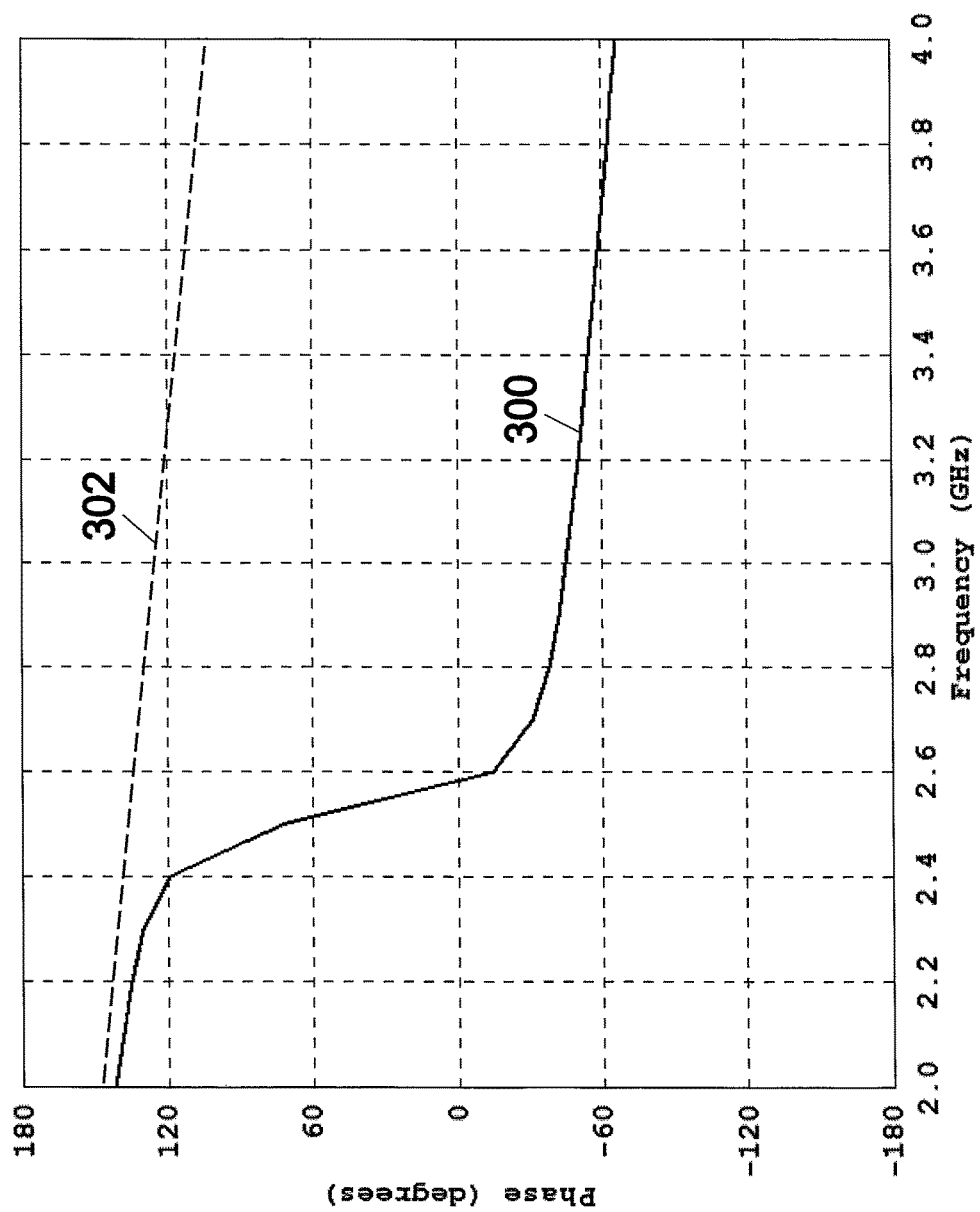

FIG. 3 is an illustration of a surface-traveling wave signal at a select signal frequency that is reflected by an exemplary embodiment comprising an apparatus according to that shown in FIG. 1; and FIG. 4 is an illustration of a graph of a phase-shift in a reflected signal that is a reflection of a surface-traveling wave signal at a select signal frequency of about 2.5 GHz, where the phase-shift was caused by an exemplary embodiment comprising an apparatus according to that shown in FIG. 1.

Corresponding reference numerals indicate corresponding parts throughout the several views of the drawings.

DETAILED DESCRIPTION

Example embodiments will now be described more fully with reference to the accompanying drawings. According to various aspects of the present disclosure, embodiments are described of an apparatus for causing a phase-shift in reflected signals of surface-traveling electromagnetic wave signals. The features, functions and advantages in the prior section can be achieved independently in various embodiments or combined in yet other embodiments. Further aspects of the present disclosure can be seen with reference to the drawings and following described embodiments.

In one exemplary embodiment illustrated in FIG. 1, an apparatus 100 is provided that comprises an elongate conductive strip 102 having a plurality of slots 104 alternatingly arranged orthogonal to each other. The conductive strip 102 preferably comprises a conductive metal or alloy. In the embodiment shown in FIG. 1, the conductive strip 102 comprises a conductive copper foil having a thickness of between 0.005 and 0.3175 centimeters, and has 9 slots 104. Alternatively, other embodiments can include a conductive strip made of other metals or alloys, and may comprise any number of slots. Each of the slots 104 have a length L that is a fraction in the range of between 9/16 and 7/8 of the wavelength $\lambda_0$ associated with a select signal frequency (i.e., a frequency the apparatus is designed for). The slots are spaced apart from each other in a manner such that the distance between center points of adjacent slots is between 0.7 and 1.0 wavelength, and preferably not more than 1 wavelength (for a select signal frequency), in order to effectively produce a phase-shift in reflected signal waves reflected by the apparatus 100. For a select signal frequency that is in the range of 2.0 to 3.0 GHz, for example, the signal wavelength would range from about 10 to 15 centimeters, so the plurality of slots 104 would have a minimum length in the range of 5.63 to 8.75 centimeters. Accordingly, an exemplary embodiment of an apparatus 100 designed for a select signal frequency range of about 2.5 GHz would include slots 104 having a length L in the range of about 5.63 to 8.75 centimeters, for example.

The apparatus 100 further includes a plurality of conductive enclosures 106 respectively disposed under each of the plurality of slots 104. Each of the plurality of conductive enclosure 106 have a width and length sufficient to enclose a respective corresponding slot 104. For example, the conductive enclosure 106 could have a length that is at least ¾ of the wavelength associated with the select signal frequency. In the embodiment shown in FIG. 1, the conductive enclosures 106 comprise conductive walls made of a copper alloy with a thickness of between 0.005 and 0.3175 centimeters. Alternatively, other embodiments may have conductive enclosures 106 that are made of other metals or alloys. In one exemplary embodiment, the interior 108 of the conductive enclosures 106 include a dielectric material comprised of air, where the enclosures form a plurality of shielded enclosures generally defining anti-resonant cavities or near anti-resonant cavities. The plurality of conductive enclosures 106 have a depth that is a fraction in the range of between ⅛ and ⅜ of the wavelength associated with the select signal frequency, when transmitted in the dielectric material. Preferably, each of the plurality of conductive enclosures 106 define a shielded enclosure forming a reflecting interior with a depth that is about ¼ of the wavelength $\lambda_d$ associated with the select signal frequency when transmitted in the dielectric material, and generally establish anti-resonant cavities or near anti-resonant cavities (e.g., cavities with which a wavelength of a select signal frequency is caused to have a phase-shift that may not be exactly 180 degrees and may vary in a range from about 150 to about 210 degrees). The plurality of slots 104 and conductive enclosures 106 defining near anti-resonant cavities cause a phase-shift of between 150 to 210 degrees in reflected signals that are reflected from surface-traveling wave signals at the select signal frequency (which impinge the apparatus). For a select signal frequency that is in the range of 2.0 to 3.0 GHz, for example, the associated wavelength would range from about 10 to 15 centimeters, so the plurality of conductive enclosures 106 would have a minimum depth in the range of about 1.25 to 3.75 centimeters. Accordingly, an exemplary embodiment of an apparatus 100 for a select signal frequency application of about 2.5 GHz would have conductive enclosures 106 with a depth of between 1.25 and 3.75 centimeters (where the enclosures contain air). Preferably, the conductive enclosures 106 are in contact with and electrically conductive with the conductive strip 102. Alternatively, the conductive enclosures 106 may be separated from the strip 102 by a small gap, to provide a capacitive effect.

In the exemplary embodiment shown in FIG. 1, the plurality of slots 104 arranged orthogonally to each other and the plurality of conductive enclosures 106 containing a dielectric material cause a phase-shift of between 150 to 210 degrees in reflected signals that are reflections of surface-traveling wave signals at a select signal frequency, where the signals impinge the apparatus 100. The plurality of slots 104 alternatingly arranged orthogonally to each other and plurality of conductive enclosures 106 are effective to cause a phase-shift in reflected signals of multi-polarity surface-traveling waves that impinge the apparatus 100, as described below.

The apparatus 100 comprises a plurality of slots 104 and plurality of conductive enclosures 106, a portion of which are arranged in a first orientation, and a portion of which are arranged in a second orientation orthogonal to the first orientation. In other words, a first portion of slots 104 are oriented orthogonal to the second portion of slots. Where a signal transmitted towards the apparatus is more in a horizontal polarity (i.e., parallel with plane of the strip 102), the signal impinges the slots in the second orientation orthogonal to the first orientation, which cause a phase-shift in resulting reflected signals. Where a signal transmitted towards the apparatus 100 is more in a vertical polarity (i.e., perpendicular to the plane of the strip 102), the signal impinges the slots in the first orientation orthogonal to the second orientation, which cause a phase-shift in resulting reflected signals. This bipolar slot arrangement ensures that the surface-traveling wave signal (at the select frequency) will result in a phase-shifted reflection, where the slots 104 and conductive enclosures 106 cause a phase-shift in the reflected signal. Where the conductive enclosures 106 have an interior 108 filled with a dielectric material comprising air, the wavelength of the signal transmitted in the conductive enclosure 106 is the wavelength associated with the select signal frequency in free space (e.g., air). The slots 104 and conductive enclosures 106 cause a phase-shift of between 150 and 210 degrees in reflected signals that result from surface-traveling waves at the select signal frequency reflected by the apparatus, as explained below.

Figure 2:
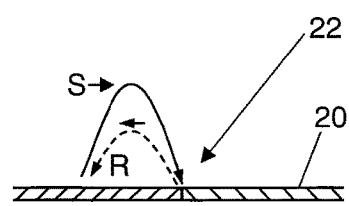
FIG. 2 is an illustration of a surface-traveling wave signal at a select signal frequency that is reflected by an irregularity on a surface.

As shown in FIG. 2, when a surface-traveling wave signal S impinges a surface irregularity 22, such as abutting edges of two plates of dissimilar material, a reflected signal waveform R results and travels in a direction opposite of the surface-traveling wave signal S. The reflected signal R reflects due to impedance discontinuity at the surface irregularity 22 (reflected signal phase depends on change in impedance). In the exemplary embodiments, the slots 104 may have an aperture impedance, and the conductive enclosures 106 including a dielectric material may have a character impedance associated with the dielectric material, where a boundary is defined at the inlet of each slot leading into the conductive enclosure 106. In the exemplary embodiments, when a surface-traveling wave signal S at the select signal frequency impinges the slot 104, the slot 104 and conductive enclosure 106 cause a phase-shift in the reflected signal R' resulting from the surface-traveling wave that is reflected, as shown in FIG. 3. Unlike a resonant cavity, which is constructed from conducting walls forming a reflecting interior with dimensions that are a multiple of ½ the wavelength, the conductive enclosures 106 have a depth of ⅛ to ⅜ of the wavelength associated with the select signal frequency. More preferably, the depth is about ¼ of the wavelength associated with the select signal frequency. The conductive enclosure 106, constructed from conducting walls in which the interior 108 is filled with a dielectric material (e.g., air), define a shielded enclosure that establishes a near anti-resonant cavity, which causes a phase-shift of between 150 and 210 degrees in reflected signals R' resulting from surface-traveling waves at the select signal frequency that impinge the slots 104 and conductive enclosures 106. As shown in FIG. 3, the apparatus 100 is disposed proximate to a surface irregularity 22. The apparatus 100 has a length corresponding to the surface irregularity 22 (as shown in FIG. 1), and has a plurality of slots 104 such that the slots span the length of surface irregularity 22. The apparatus 100 causes a phase shift in the reflected signal R' (see FIG. 3), where the phase-shifted reflected signal R' is phase-shifted about 180 degrees relative to the reflected signal R reflected by the surface irregularity 22 (see FIG. 2). Thus, the apparatus 100 is effective to filter reflected signals resulting from surface-traveling waves at the select signal frequency that are reflected by a surface irregularity 22.

According to another aspect of the present disclosure, a second embodiment of an apparatus is provided, which comprises a conductive strip having a plurality of slots alternatingly arranged orthogonal to each other and a plurality of conductive enclosures respectively disposed under the plurality of slots, where the enclosures further comprise a dielectric material with a relative permeability of 1 to 10. The second exemplary embodiment preferably comprises an apparatus similar to the first embodiment in FIG. 1, which includes a conductive strip 102 having a plurality of slots 104 alternatingly arranged orthogonal to each other and having a length that is a fraction (between 9/16 and 7/8) of the wavelength $\lambda_0$ of the select signal frequency to be altered. The plurality of slots are spaced apart from each other in a manner such that the distance between center points of adjacent slots is between 0.7 and 1.0 wavelength for the select signal frequency, in order to effectively produce a phase-shift in signal waveforms reflected by the apparatus 100. The apparatus also includes a plurality of conductive enclosures 106 disposed under each of the plurality of slots 104. Each of the conductive enclosure 106 has a width and length sufficient to enclose a respective corresponding slot 104. The conductive enclosures 106 have a depth that is a fraction in the range of between 1/8 and 3/8 of the wavelength $\lambda_d$ associated with the select signal frequency, when transmitted in the dielectric material in the conductive enclosures. The select signal frequency may be a frequency in the range of 4.0 to 8.0 GHz for example, or a frequency of 2.0 to 4.0 GHz having a wavelength between 7.5 and 15 centimeters.

In the second exemplary embodiment, the conductive enclosures 106 comprise a dielectric material 110 other than air, which is disposed in the interior of the conductive enclosure 106 as illustrated in FIG. 1 by the shaded region in the right-most enclosure. The dielectric material preferably has a relative permeability μ of between 1 and 10, where the absolute permeability of the dielectric material is the product of the permeability in air or free space (1.257× 10−6 H/m) and the relative permeability value. Dielectric materials with an acceptable relative permeability include epoxy or fiberglass. Other dielectric materials with a relative permeability between 1 and 10 may comprise a paramagnetic material, such as a polyaniline containing carbonyl iron that has a relative permeability of 4 when measured at 2 to 8 MHz, or a dielectric absorbing medium combined with ferrite to yield a relative permeability of 10. The conductive enclosures 106 include a dielectric material with a relative permeability μ between 1 and 10 in an amount that is effective to cause the wavelength $\lambda_d$ of a select signal frequency transmitted in the dielectric material to be shorter than that in free space. The enclosures 106 may also use dielectric materials with a relative permeability over 10, such as barium, strontium hexaferrite or other suitable materials. The dielectric material may also have a relative permittivity between 1 and 20, and more preferably between 1 and 4.6. The conductive enclosures have a depth that is a function of the relative permeability of the dielectric material and wavelength of the select signal frequency that the apparatus is designed to phase-shift. The plurality of slots 104 arranged orthogonally to each other, and the conductive enclosures 106 having a dielectric material with a relative permeability from 1 to 10 (resulting in a signal wavelength $\lambda_d$ in the dielectric material that is shorter than the signal wavelength $\lambda_0$ in free space), cause a phase-shift of between 150 and 210 degrees in reflected signals resulting from surface-traveling wave signals at the select signal frequency that impinge the apparatus, as explained below.

As shown in FIG. 2, when a surface-traveling wave signal S impinges a surface irregularity 22, such as abutting edges of two plates of dissimilar material, a reflected signal waveform R results and travels in a direction opposite of the surface-traveling wave signal S. The reflected signal R reflects due to impedance discontinuity at the surface irregularity. In the exemplary embodiments, the slots 104 may have an aperture impedance, and the conductive enclosures 106 including a dielectric material may have a character impedance associated with the dielectric material, where a boundary is defined at the inlet of each slot leading into the conductive enclosure 106. In the exemplary embodiments, when a surface-traveling wave signal S at the select signal frequency impinges the slot 104, the slot 104 and conductive enclosure 106 cause a phase-shift in the reflected signal R' resulting from the surface-traveling wave that is reflected, as shown in FIG. 3. Unlike a resonant cavity, which is constructed from conducting walls forming a reflecting interior with dimensions that are a multiple of ½ the wavelength, the conductive enclosures 106 have a depth of ⅛ to ⅜ of the wavelength associated with the select signal frequency. More preferably, the depth is about ¼ of the wavelength associated with the select signal frequency. The conductive enclosure 106, constructed from conducting walls in which the interior is filled with a dielectric material (e.g., other than air), define a shielded enclosure that establishes a near anti-resonant cavity, which causes a phase-shift of between 150 and 210 degrees in reflected signals R' resulting from surface-traveling waves at the select signal frequency that impinge the slots 104 and conductive enclosures 106. As shown in FIG. 3, the apparatus 100 is disposed proximate to a surface irregularity 22. The apparatus 100 has a length corresponding to the surface irregularity 22 (as shown in FIG. 1), and has a plurality of slots 104 such that the slots span the length of surface irregularity 22. The apparatus 100 causes a phase shift in the reflected signal R' (see FIG. 3), where the phase-shifted reflected signal R' is phase-shifted about 180 degrees relative to the reflected signal R reflected by the surface irregularity 22 (see FIG. 2). Thus, the apparatus 100 is effective to filter reflected signals resulting from surface-traveling waves at the select signal frequency that are reflected by a surface irregularity 22.

Since the second exemplary embodiment includes enclosures 106 with a dielectric material (other than air) that results in a shorter wavelength $\lambda_d$ of the select signal frequency when transmitted in the dielectric material, the conductive enclosures will have a depth (of about ¼ of the effective wavelength for the select signal frequency when transmitted in the dielectric material) that is reduced relative to an air-filled enclosure. Thus, the second exemplary of an apparatus 100 including a dielectric material (other than air) with a relative permeability between 1 and 10, which causes the select signal's wavelength to be shorter within the dielectric and results in a reduced profile or cross-section of the apparatus 100 (relative to conductive enclosures containing only air). For a select signal frequency application in the range of about 2.0 to 4.0 GHz (with an associated wavelength of 7.5 to 15.0 centimeters), the second embodiment will include conductive enclosures 106 with a minimum depth in the range of about 0.94 to 2.81 centimeters. Thus, the apparatus 100 of the second embodiment has a minimal cross-section or height of between 1.0 to 3.0 centimeters for a select signal frequency application in the range of 2.0 to 4.0 GHz.

According to another aspect of the present disclosure, exemplary embodiments may further comprise a structure 20 on which the apparatus 100 is disposed, as illustrated in FIG. 1. The apparatus 100 is positioned on a surface of a structure 20, proximate to or adjacent a surface irregularity 22 on the surface, such as adjoining edges of two plates of dissimilar material, an edge along overlapping exterior surfaces, or other similar surface discontinuities, for example. The apparatus 100 is disposed proximate to the surface irregularity 22 (comprising an edge, dissimilar material or other feature), such that the apparatus 100 will cause a phase-shift in reflected signals that are reflections of surface-traveling waves at the select signal frequency that impinge the apparatus 100. The phase-shifted reflected signals produced by the apparatus 100 may also cause a signal phase-interfering effect, relative to reflections of surface-traveling wave signals at the select signal frequency that are reflected by the surface irregularity 22 (see reflected signals in FIG. 2 and FIG. 3), such that the apparatus effectively filters reflected signals resulting from surface-traveling wave signals at the select signal frequency. Exemplary embodiments of an apparatus, when disposed on a structure proximate to a surface irregularity, are accordingly effective to filter reflected signals of surface-traveling wave signals at a select signal frequency that impinge the apparatus and surface irregularity. Examples of structures that the apparatus can be disposed on relative to a surface irregularity may include surface wave propagation components, or structural surfaces on vehicles, for example.

Referring to FIG. 4, an illustration of a graph is shown, depicting a phase-shift in a reflected signal, which is a reflection of a surface-traveling wave signal at a select signal frequency in the range of 2.0 to 3.0 GHz that was reflected by a third exemplary embodiment of an apparatus. The third exemplary embodiment preferably comprises an apparatus similar to the first embodiment in FIG. 1, and comprises a conductive strip 102 having a plurality of slots 104 alternatingly arranged orthogonal to each other. In the third exemplary embodiment, the conductive strip 102 is made of copper at a thickness of about 0.005 centimeters, and is 80 centimeters long. The strip 102 has 24 slots 104 alternatingly arranged orthogonal to each other. Each slot has a width of about 0.1 centimeters, and a length that is a fraction of 9/16 to 7/8 of the wavelength for a select signal frequency between 2.0 and 3.0 GHz (a wavelength of 15 to 10 centimeters). For a minimum wavelength of 10 centimeters (3 GHz), a fraction of 9/16 yields a minimum slot length of 5.63 centimeters. The third exemplary embodiment may also be designed and utilized for a select signal frequency between 2.0 and 4.0 GHz (a wavelength of 15 to 7.5 centimeters), where for a minimum wavelength of 7.5 centimeters, a fraction of 9/16 yields a minimum slot length of about 4.21 centimeters. Accordingly, the third exemplary embodiment preferably has slots 104 with a minimum length of between 4.21 and 5.63 centimeters (1.625 inches to 2.215 inches).

The apparatus 100 further includes a plurality of conductive enclosures 106 respectively disposed under each of the plurality of slots 104, each having a length sufficient to enclose a corresponding slot 104. In the third exemplary embodiment, the conductive enclosures 106 are made of a copper alloy. The interior of the enclosures include an epoxy dielectric material such as fiber reinforced polymer resin, for example. The epoxy dielectric material has a relative permeability μ of between 1.0 and 1.3 (when measured at 2 GHz to 12 GHz) and a relative permittivity of 4.6, which is effective to cause the wavelength $\lambda_d$ associated with the select signal frequency of 2.5 GHz to be shorter within the dielectric material than the wavelength $\lambda_0$ in free space (e.g., air). In the third exemplary embodiment, the conductive enclosures 106 have a depth that is about ¼ of the wavelength associated with the select signal frequency of 2.5 GHz when transmitted in the epoxy dielectric material, such that the depth is between about 1.5 to 2.0 centimeters. Each of the conductive enclosures 106, constructed from conducting walls in which the interior is filled with the epoxy dielectric material, define a shielded enclosure forming a reflecting interior to establish a near anti-resonant cavity.

As shown in the graph illustrated in FIG. 4, a phase-shift is present in the plot of the phase angle of the reflected signal (indicated as line 300), as a result of the slots 104 and the conductive enclosures 106 forming near anti-resonant cavities. The plot of the reflecting phase angle of the reflected signal is shown with a starting phase-angle of about 150 degrees, from which the phase angle of the reflected signal 300 gradually decreases. As the signal frequency increases and approaches the select signal frequency of about 2.5 GHz, the reflected signal phase angle depicted in the graph is phased-shifted from a phase-angle above 135 degrees to a phase angle below negative 35 degrees (a shift of 170 degrees), relative to the projected phase angle for a reflected signal that is not altered (by the apparatus) shown by the dashed line 302. As shown in the graph, the phase-shift occurs within the select signal frequency range of between 2.3 GHz and 2.7 GHz. Accordingly, the [near] near anti-resonant cavity causes a phase-shift in reflected signals resulting from surface-traveling wave signals at the select signal frequency that impinge the apparatus 100. The plurality of slots 104 arranged orthogonally to each other, and the conductive enclosures 106 having the epoxy dielectric material with a relative permeability of between 1.0 and 1.3, cause a phase-shift of between 150 and 210 degrees in reflected signals associated with surface-traveling wave signals at the select signal frequency of 2.5 GHz impinging the apparatus of the third exemplary embodiment. More preferably, the plurality of slots 104 and conductive enclosures 106 cause a phase-shift of about 180 degrees in reflected signals associated with surface-traveling wave signals at the select signal frequency of 2.5 GHz impinging the apparatus of the third exemplary embodiment.

According to another aspect of the present disclosure a method is provided for causing a phase-shift in reflected signals that are a reflection of surface-traveling wave signals of a select signal frequency. The method comprises the steps of forming a plurality of slots in an elongate conductive strip, alternatingly arranged orthogonal to each other, each slot having a length that is a fraction of between 9/16 and 7/8 of the wavelength $\lambda_0$ associated with the select signal frequency, and affixing a plurality of conductive enclosures to the conductive strip. The method includes affixing the plurality of conductive enclosures with each of the plurality of conductive enclosures respectively disposed under each of the plurality of slots and having a width and length sufficient to enclose a corresponding respective slot, where each of the conductive enclosures includes a dielectric material therein and has a depth that is a fraction of between ⅛ and ⅜ of the wavelength associated with the select signal frequency when transmitted within the dielectric material. The method of forming the plurality of slots arranged orthogonally to each other, and affixing the plurality of conductive enclosures aligned with the plurality of slots, causes a phase-shift in the range of 150 to 210 degrees in reflected signals that are a reflection of surface-traveling wave signals at the select signal frequency which impinge the apparatus.

In the exemplary embodiment of a method, the step of forming a plurality of slots comprises forming slots with a length that is in the range of 9/16 to ⅞ of the wavelength associated with the select signal frequency. The slots may be formed by machining or stamping processes, or laser-cutting or other suitable methods. The method comprises forming slots with a length that is in the range of 9/16 to ⅞ of the wavelength associated with the select signal frequency. The step of forming the slots may further comprise forming the plurality of slots to be spaced apart in a manner such that the distance between center points of adjacent slots are between 0.7 and 1.0 wavelength associated with the select signal frequency. The step of affixing a plurality of conductive enclosures preferably comprises affixing conductive enclosures having a depth that is between ⅛ and ⅜ of the effective wavelength $\lambda_d$ associated with the select signal frequency when transmitted through the dielectric material in the conductive enclosures. The conductive enclosures may be affixed to the conductive strip by welding, soldering, adhesives or curable materials, and other methods for bonding components. The method further comprises the step of including a dielectric material with a relative permeability of between 1 and 10 within each of the conductive enclosures, in an amount that is effective to define a shielded enclosure establishing a near anti-resonant cavity, such that the conductive enclosures cause a phase-shift in the range of 150 to 210 degrees in reflected signals that are reflected from surface-traveling waves at the select signal frequency. The method may also comprise the step of including within the enclosures a dielectric material other than air, having a relative permeability of between 1 and 1.3, where as a result of the shorter effective wavelength associated with the select signal frequency when transmitted through the dielectric material, the apparatus has a minimal profile height of between 1.5 and 2.0 centimeters for a select signal frequency in a range of 2.3 to 2.7 GHz. The step of including a dielectric material may comprise including an epoxy or a fiberglass in the enclosure.

The exemplary embodiment of a method may further include the step of installing the apparatus onto a surface of a structure proximate to a surface irregularity on the structure. The apparatus is installed proximate to the surface irregularity, such that phase-shifted reflected signals that are reflected from surface-traveling wave signals at the select signal frequency cause a signal phase-interfering effect relative to reflections of surface-traveling waves at the select signal frequency that are reflected by the surface irregularity, whereby the apparatus effectively filters reflected signals of surface-traveling wave signals at the select signal frequency.

Accordingly, exemplary embodiments of an apparatus may be disposed on a structure proximate to a surface irregularity, to effectively filter reflected signals of surface-traveling wave signals at a select signal frequency that may impinge the apparatus and surface irregularity. Examples of structures that the apparatus can be disposed on relative to a surface irregularity may include surface wave propagation components, or structural surfaces on a vehicle, for example (see FIG. 2). Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. Such variations are not to be regarded as a departure from the invention, and all such modifications are intended to be included within the scope of the invention.

What is claimed is:

1. An apparatus configured to cause a phase-shift in reflected signals that are a reflection of surface-traveling wave signals of a select signal frequency, comprising:
   a conductive strip, having a plurality of slots therein alternatingly arranged orthogonal to each other, each slot having a length that is a fraction of between 9/16 and ⅞ of a wavelength $\lambda_o$ associated with the select signal frequency;
   a plurality of conductive enclosures respectively disposed under each of the plurality of slots, each conductive enclosure having a width and length sufficient to enclose a respective corresponding slot, wherein each of the conductive enclosures have a dielectric material therein and have a depth that is a fraction of between ⅛ and ⅜ of a wavelength $\lambda_d$ associated with the select signal frequency when transmitted in the dielectric material;
   wherein the plurality of slots and plurality of conductive enclosures cause a phase-shift in the range of 150 to 210 degrees in the reflected signals that are a reflection of the surface-traveling wave signals at the select signal frequency which impinge the apparatus.

2. The apparatus of claim 1, wherein each of the slots have the length that is about ¾ of the wavelength $\lambda_o$ associated with the select signal frequency.

3. The apparatus of claim 1, wherein the plurality of slots are spaced apart in a manner such that a distance between center points of adjacent slots are between 0.7 and 1.0 of the wavelength $\lambda_0$ associated with the select signal frequency.

4. The apparatus of claim 3, wherein each of the plurality of conductive enclosures define a shielded enclosure forming a reflecting interior with the depth that is between ⅛ and ⅜ of the wavelength $\lambda_d$ associated with the select signal frequency when transmitted in the dielectric material, which establishes an anti-resonant cavity that causes the phase-shift in the range of 150 to 210 degrees in reflected signals that are reflected from surface-traveling wave signals at the select signal frequency.

5. The apparatus of claim 3, wherein the depth of each of the conductive enclosures is about ¼ of the wavelength $\lambda_d$ associated with the select signal frequency when transmitted in the dielectric material.

6. The apparatus of claim 5, wherein the dielectric material has a relative permeability that is effective to establish an impedance discontinuity at each slot's inlet that is sufficient to cause the phase-shift in the range of 150 to 210 degrees in reflected signals that are the reflection of surface-traveling wave signals at the select signal frequency.

7. The apparatus of claim 5, wherein the dielectric material has a relative permeability that is between 1 and 10.

8. The apparatus of claim 7, wherein the dielectric material has a relative permittivity between 1 and 20.

9. The apparatus of claim 8, further comprising a surface structure of a vehicle on which the apparatus is disposed, where the apparatus is disposed on the surface proximate to a surface irregularity on the surface.

10. The apparatus of claim 9, wherein the phase-shifted reflected signals that are reflections of surface-traveling wave signals at the select signal frequency cause a signal-cancelling effect, relative to reflections of surface-traveling wave signals at the select signal frequency that are reflected by the surface irregularity, such that the apparatus effectively filters reflected signals of surface-traveling wave signals at the select signal frequency.

11. The apparatus of claim 5, wherein the plurality of conductive enclosures include the dielectric material with a relative permeability between 1.0 and 3.0, and have the depth of about ¼ of the effective wavelength $\lambda_d$ associated with the select signal frequency when transmitted in the dielectric material, whereby the apparatus has a minimal profile height of between 1.5 centimeters and 2.0 centimeters as a result of the shorter effective wavelength $\lambda_d$ of the select signal when transmitted in the dielectric material.

12. A method for producing an apparatus for causing a phase-shift in reflected signals that are a reflection of surface-traveling wave signals of a select signal frequency, comprising the steps of:
forming a plurality of slots in a conductive strip, alternatingly arranged orthogonal to each other, each slot having a length that is a fraction of between 9/16 and ⅞ of a wavelength $\lambda_0$ associated with the select signal frequency;
affixing a plurality of conductive enclosures to the conductive strip, with each of the conductive enclosures respectively disposed under each of the plurality of slots and having a width and length sufficient to enclose a corresponding respective slot, each of the conductive enclosures including a dielectric material therein and having a depth that is a fraction of between ⅛ and ⅜ of a wavelength $\lambda_d$ associated with the select signal frequency when transmitted in the dielectric material;
whereby the plurality of slots and plurality of conductive enclosures cause a phase-shift in the range of 150 to 210 degrees in the reflected signals that are a reflection of the surface-traveling wave signals at the select signal frequency which impinge the apparatus.

13. The method of claim 12, wherein forming the plurality of slots comprises forming slots having a length that is about ¾ of the wavelength $\lambda_0$ associated with the select signal frequency.

14. The method of claim 13, wherein forming the plurality of slots comprises forming the plurality of slots to be spaced apart in a manner such that a distance between center points of adjacent slots are between 0.7 and 1.0 of the wavelength $\Delta_0$ associated with the select signal frequency.

15. The method of claim 14, wherein the step of affixing the plurality of conductive enclosures comprises affixing conductive enclosures having the depth of about ¼ of the effective wavelength $\lambda_d$ associated with the select signal frequency when transmitted through the dielectric material in the conductive enclosures.

16. The method of claim 15, further comprising the step of including the dielectric material with a relative permeability of between 1 and 10 within each of the conductive enclosures, in an amount that is effective to define a shielded enclosure generally establishing an anti-resonant cavity, such that the conductive enclosures cause the phase-shift in the range of 150 to 210 degrees in the reflected signals that are reflected from surface-traveling wave signals at the select signal frequency.

17. The method of claim 16, wherein the step of including the dielectric material comprises including a low-loss dielectric material having a relative permeability between 1 and 1.5 and a relative permittivity between 1 and 4.6, whereby the apparatus has a minimal profile height of between 1.5 centimeters and 2.0 centimeters as a result of the shorter effective wavelength $\lambda_d$ associated with the select signal frequency when transmitted through the dielectric material.

18. The method of claim 16, wherein the step of including the dielectric material comprises including one of an epoxy and a fiberglass material.

19. The method of claim 16, further comprising the step of installing the apparatus onto a vehicle proximate to a surface irregularity on the vehicle.

20. The method of claim 16, further comprising the step of installing the apparatus onto a vehicle proximate to a surface irregularity on the vehicle, such that the phase-shifted reflected signals that are reflected from surface-traveling wave signals at the select signal frequency cause a signal-cancelling effect relative to reflections of surface-traveling wave signals at the select signal frequency that are reflected by the surface irregularity, whereby the apparatus effectively filters reflected signals of surface-traveling wave signals at the select signal frequency.

* * * * *

UNITED STATES PATENT AND TRADEMARK OFFICE
CERTIFICATE OF CORRECTION

PATENT NO. : 10,116,023 B2
APPLICATION NO. : 15/332455
DATED : October 30, 2018
INVENTOR(S) : Gilchrist et al.

It is certified that error appears in the above-identified patent and that said Letters Patent is hereby corrected as shown below:

In the Claims

Column 12,
Lines 18 and 19, "adjacent slots are between 0.7 and 1.0 of the wavelength $\lambda_0$ associated with the select signal frequency." should read --adjacent slots are between 0.7 and 1.0 of the wavelength $\lambda_0$ associated with the select signal frequency.--.

Signed and Sealed this
Eighteenth Day of June, 2019

Andrei Iancu
*Director of the United States Patent and Trademark Office*